UNITED STATES PATENT OFFICE.

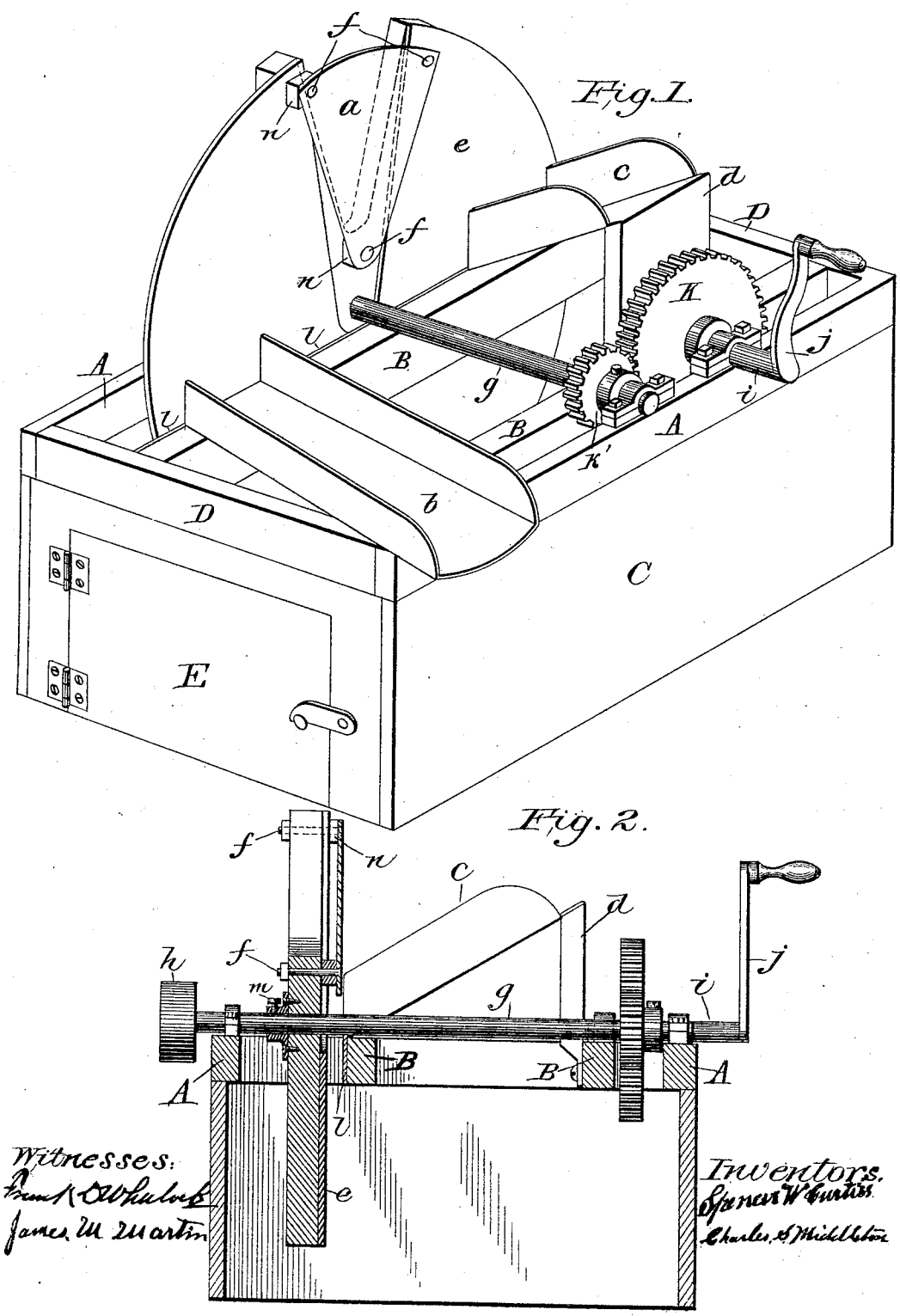

SPENCER W. CURTISS AND CHARLES S. MIDDLETON, OF SUGAR GROVE, PENNSYLVANIA.

MACHINE FOR CUTTING CORNSTALKS, STRAW, AND ROOTS.

SPECIFICATION forming part of Letters Patent No. 452,262, dated May 12, 1891.

Application filed January 16, 1890. Serial No. 337,143. (No model.)

*To all whom it may concern:*

Be it known that we, SPENCER W. CURTISS and CHARLES S. MIDDLETON, citizens of the United States, residing at Sugar Grove, in the county of Warren and State of Pennsylvania, have invented a new and useful Machine for Cutting Cornstalks, Straw, and Roots, of which the following is a specification.

Our invention relates to improvements in combined cornstalk, straw, and root cutting machines in which a two-edged triangular-shaped rotating knife acts in conjunction with a horizontal steel face-plate $ll$. By a forward motion of the knife one edge cuts stalks, straw, &c., and by a reverse motion the other edge cuts roots. We attain these objects by the mechanism illustrated in the accompanying drawings, in which—

Figure 1 is an elevation view of the entire machine. Fig. 2 is a sectional view.

Similar letters refer to similar parts through the different views.

The rails A A, the cross-bars D D, supported by the box C, and the girts B B constitute the frame-work of the entire machine. The box C holds the cut feed as it drops from the knife $a$, and is taken out by the door E. The trough $b$ holds the stalks or straw while being cut by the knife $a$. The trough $c$ holds the roots while being cut by the knife $a$. The standard $d$ supports the trough $c$ and is fastened to one of the girts B. The knife $a$ is fastened to the fly-wheel $e$ by bolts $ff$. The shaft $g$ may be driven by a belt passing around the pulley $h$; or it may be driven from a shaft $i$ furnished at one end with a handle $j$ and at the other with a cog-wheel $k$, gearing into a pinion $k'$ on the said shaft $g$, the letters $l\,l\,l\,l$ showing the position of the steel face-plate on the side of one of the girts B, Fig. 1, as shown in the accompanying drawings, and the letter $m$, Fig. 2, the set-screw for adjusting the knife-wheel, and $n\,n$, Fig. 1, the washers between the knife $a$ and fly-wheel $e$.

To adjust the machine for cutting stalks or straw, turn the set-screw in the hub, which allows the knife to slide back from the face-plate, which must be adjusted by putting washers on the bolts between the knife and plank. By this process the operator can obtain the length of cut desired.

The parts of our invention being constructed and arranged as described, its operation is as follows: To operate the machine as a straw-cutter, the knife-disk is caused to rotate to the left. The straw or other material to be cut is then fed through the trough $b$ to the knife $a$, which coacts in its course of revolution with the steel face-plate $l$. The trough $b$ is placed on the frame obliquely with respect to the plane of the knife-disk, as illustrated, and a shearing motion is thus obtained which facilitates the cutting operation.

In order to operate the machine as a root-cutter it is only necessary to reverse the knife-disk, and in turn the other edge of the knife $a$ is brought into co-operation with the face-plate $l$, and the dulling of the straw-cutting edge by using it for roots and the like containing grit, &c., is thus obviated. The roots are then placed in the feed-trough $c$, and the latter being inclined downward toward the knife-disk the roots descend to the knife of their own weight.

Most machines of this class are provided with an adjustable feed mechanism for the straw, stalks, or other material, but this causes considerable complication of parts and also the expenditure of additional power in its operation.

In our machine we have designed another method of adjusting the length of cut. For instance, in order to lengthen the cut, the set-screw $m$, Fig. 2, on the hub of the knife-disk $e$ is loosened, and the whole knife-disk is moved to the desired distance away from the face-plate $l$. The knife $a$ is then properly adjusted with respect to this face-plate by removing the bolts $fff$, inserting between the knife and the knife-disk washers $n$ of the requisite thickness, and replacing the bolts.

It will be understood that the straw or other material is fed through the feed-trough until it abuts against the surface of the revolving knife-disk $e$, whereupon the knife $a$ in its revolution cuts it off, and it is evident that by varying the interval between the knife-disk $e$ and the face-plate $l$ the length of straw or other material thus cut off may be varied at pleasure.

What we claim as our invention, and desire to secure by Letters Patent, is—

In a machine for cutting straw, stalks, roots, and the like, the combination of the frame, a knife-disk carrying a two-edged triangular knife revolubly mounted thereon, means for rotating said disk, a face-plate with which said knife coacts, feed-troughs located opposite to each other on the frame and so disposed with respect to the knife-disk that material fed through the one or the other is operated upon according to the direction of rotation, said knife-disk being adjustably mounted on its shaft, and said triangular knife being adjustably mounted on said knife-disk, substantially as described.

SPENCER W. CURTISS.
CHARLES S. MIDDLETON.

Witnesses:
FRANK D. WHEELOCK,
J. M. MARTIN.